April 23, 1963 J. P. TARBOX 3,086,450
WIRE TIER

Filed Feb. 2, 1959 6 Sheets-Sheet 1

INVENTOR.
JOHN P. TARBOX
BY
Joseph Allen Brown
ATTORNEY

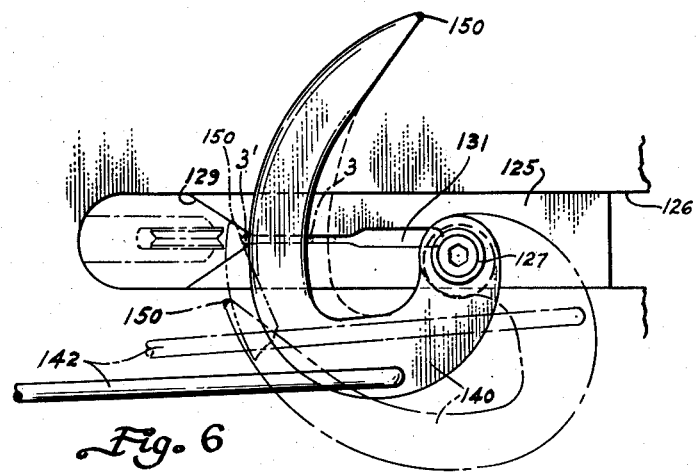
Fig. 6
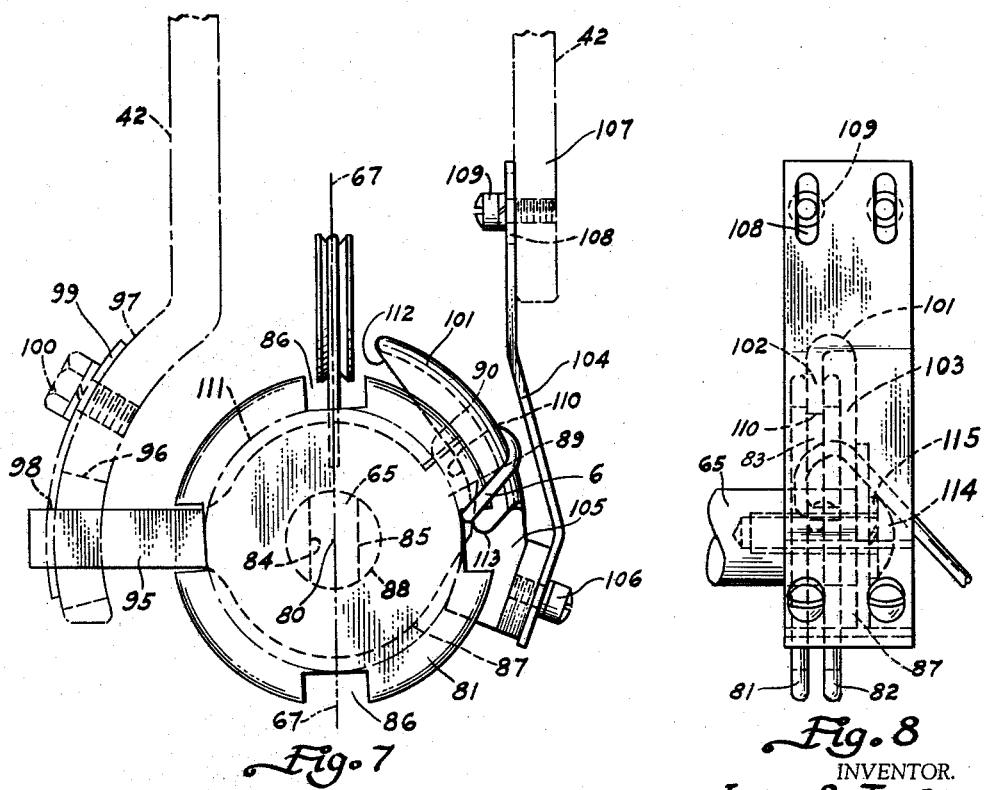
Fig. 7
Fig. 8
INVENTOR.
JOHN P. TARBOX
BY
Joseph Allen Brown
ATTORNEY April 23, 1963 J. P. TARBOX 3,086,450
WIRE TIER
Filed Feb. 2, 1959 6 Sheets-Sheet 5
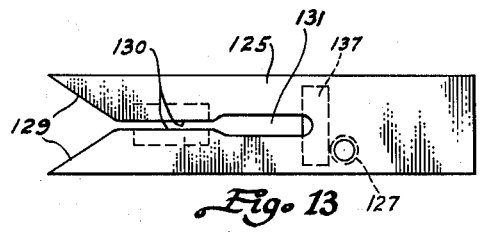
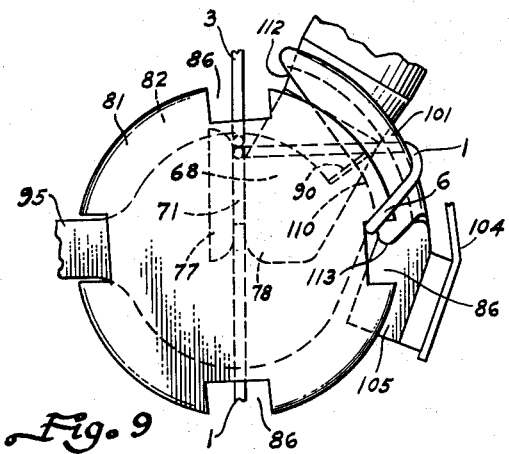
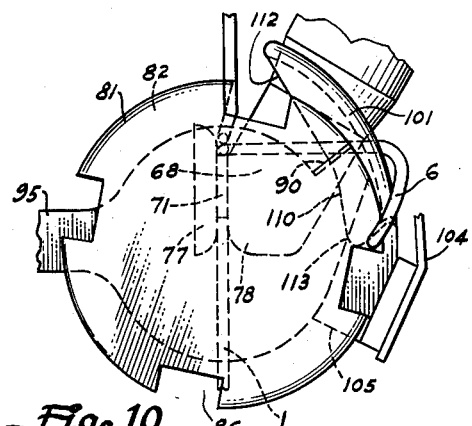
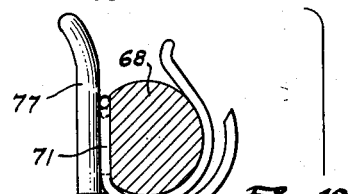
INVENTOR.
JOHN P. TARBOX
BY
*Joseph Allen Brown*
ATTORNEY

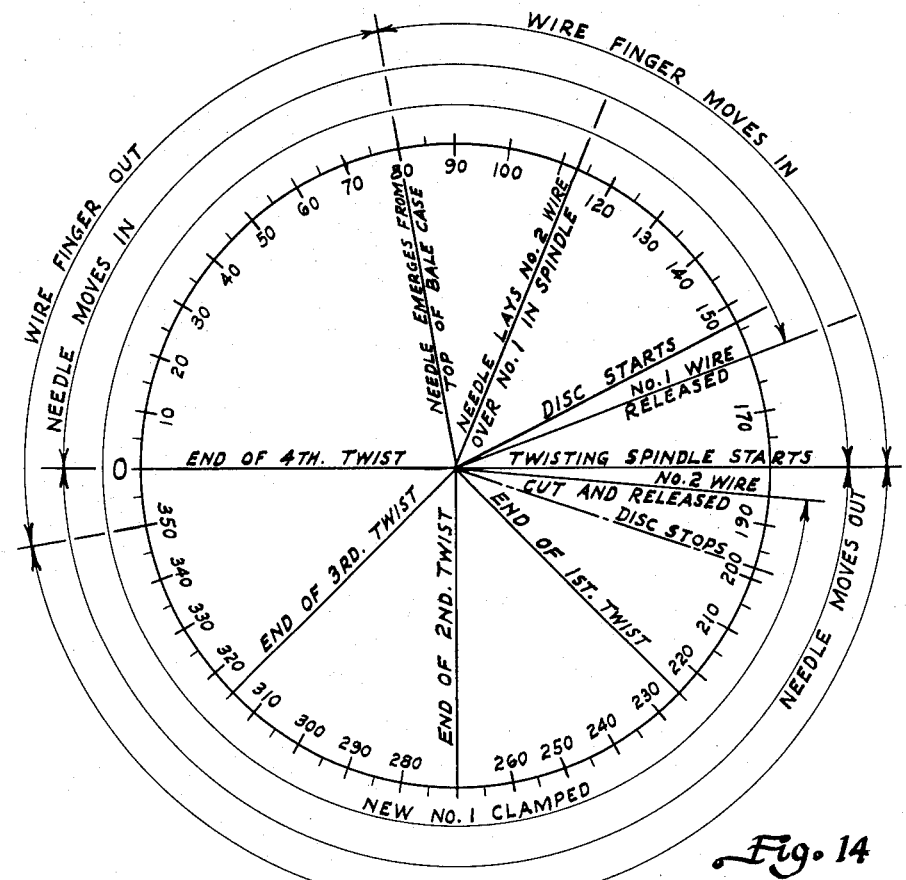
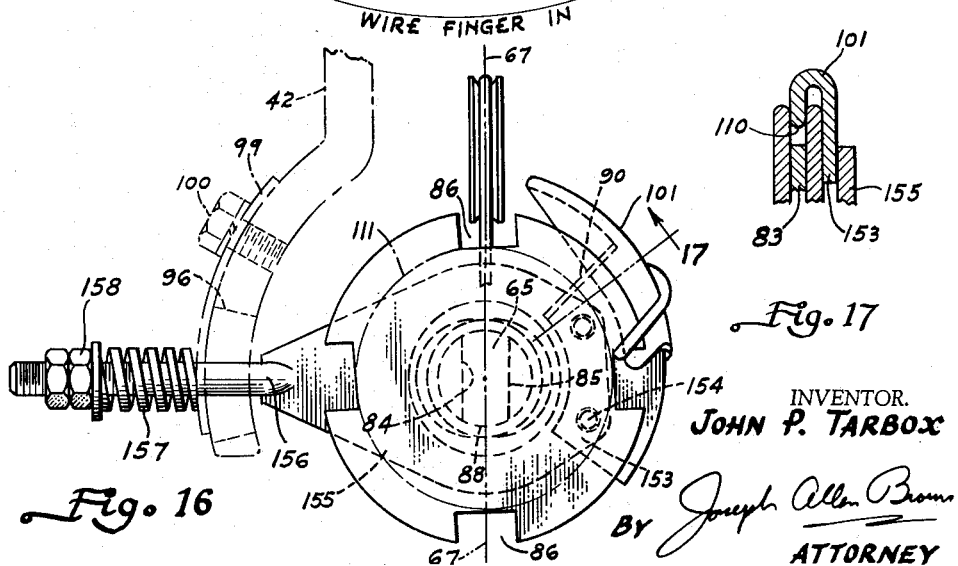

United States Patent Office 3,086,450
Patented Apr. 23, 1963

3,086,450
WIRE TIER
John P. Tarbox, Philadelphia, Pa., assignor to Sperry Rand Corporation, New Holland, Pa., a corporation of Delaware
Filed Feb. 2, 1959, Ser. No. 790,552
15 Claims. (Cl. 100—22)

This invention relates to tying mechanisms and more particularly to a wire tying mechanism for use on a baling machine which compresses material such as hay or straw into bales and binds the bales with wire strands looped about them. The mechanism is of a type in which the tie is made by twisting together in a single twist coextended ends of the binding loops through a twisting engagement of their extremities, as contrasted with twisting together oppositely extended ends in a double twist through a twisting engagement intermediate their extremities. The tie is thus constituted of a single offset twist instead of a double in-line twist.

A primary object of this invention is to provide a simplified wire twisting mechanism of the character described. This connotes not only a mechanism of simplified parts and fewer parts, but also an operational simplicity. It follows that both first costs and maintenance costs are reduced. An outstanding means of simplification is an arrangement of parts which permits the laying of the coextended ends of wires to be twisted together directly into a twisting slot provided in a twisting spindle while the spindle remains at rest.

Another object of this invention is to provide a wire twisting spindle having, within its periphery, a wire receiving and twisting slot with side and bottom walls of such nature and so related to the adjoining spindle surfaces as to form a secure, even twist of the wire, and from which slot the untwisted portion of the ends remaining after the twist is completed may be released or pulled with least force and without any impairment of the form of the twist, the strength of the tie, or damage to the engaging parts of the spindle.

Another object of this invention is to provide for the formation of the twist by the wire twisting spindle approximately upon or near to the axis of the spindle, to assure not only a more uniform spiraling in the twist, but also the least gyration of the strands and working of the metal while the twist is being made.

Modification of the notched disc type of free end clamping device common in twine knotters to adapt it to use in a wire tying mechanism is also an object. The aim here is not only to give the disc and appertaining parts a form which securely clamps wire but also a form which cuts the needle loop strand without the waste common in certain twine knotter devices and ensures passage of the newly clamped free end and the connected loop to its lay position in the spindle slot, all with a minimum of free end length.

An object of importance is the attainment of complete interchangeability of this wire tier with certain twine knotters commonly used. The aim here is to render it feasible simply to slip the knotters bodily off the tier shaft and slip the wire tiers on in their places, using the same mounts and drives, such as frames, frame anchors, bearings, main and cam shafts, keyways, keys, etc., and such other parts as may prove commonly useable.

A further object is the achieving of a self-contained tier unit which can be accommodated in such minimum width of space as to permit assembly side by side on one and the same drive shaft of any desired number of tiers. Units can be added or subtracted to achieve either two or three wire baling.

Other objects of this invention will be apparent hereinafter from the specification and from the recital in the appended claims.

In the drawings:

FIG. 1 is a diagrammatic, fragmentary, side elevation showing the interrelationships and interconnections of the wire tie mechanism of this invention, the bale case, the needle which passes the wire through the bale case to the wire tie mechanism, the bale length control of the wire tie mechanism, the plunger which compresses the hay within the bale case, and the power connection of the tier with the plunger drive;

FIG. 2 is an enlarged side elevation of the wire tie mechanism as mounted upon the top of the bale case, showing the needle in the same relationship to the bale case and the tier which it has in FIG. 1, the point of the needle being in its extreme uppermost position in which it has passed the wire through the bale case and completed the wire loop around the bale. The coextended ends and the parts of the mechanism are shown in those relationships they occupy just as the twisting together of the ends is about to start. Certain parts are shown in phantom dot and dash lines to afford greater clarity of showing of other parts;

FIG. 5 is a perspective view of the twisting spindle;

FIG. 6 is a plan view of a wire engaging member and guide which moves into a position and guides toward the twisting spindle the second of the wires which is to be laid;

FIG. 7 is a semi-diagrammatic rear elevation of the principle portions of the clamping device for the coextending ends of the loop to be twisted together;

FIG. 8 is a right side elevation of that portion of the clamping and cutting device depicted in FIG. 7;

FIGS. 9–12 are diagrammatic rear views showing in elevation the relationship between the cutting and clamping device, the twisting spindle, and the coextending wire ends to be twisted together at various stages of the cutting, clamping and twisting. All of the views show the twisting spindle in dotted lines in front of the clamping discs, and two of them, FIGS. 11 and 12, show, in conjunction, plan sectional views of the spindle ends;

FIG. 13 is a top plan view of the bale case slot guide;

FIG. 14 is a 360° timing diagram of the various principle operations of the wire tying mechanism with reference to the single revolution of the driving shaft of the mechanism within which the tie is accomplished;

FIG. 15 is a fragmentary view showing the twisting end of the twisting spindle;

FIG. 16 is a semi-diagrammatic rear elevation, similar to FIG. 7, and showing a wire clamping device constructed according to another embodiment of this invention; and FIG. 17 is a section taken on the line 17—17 of FIG. 16 looking in the direction of the arrows.

Figure 1:
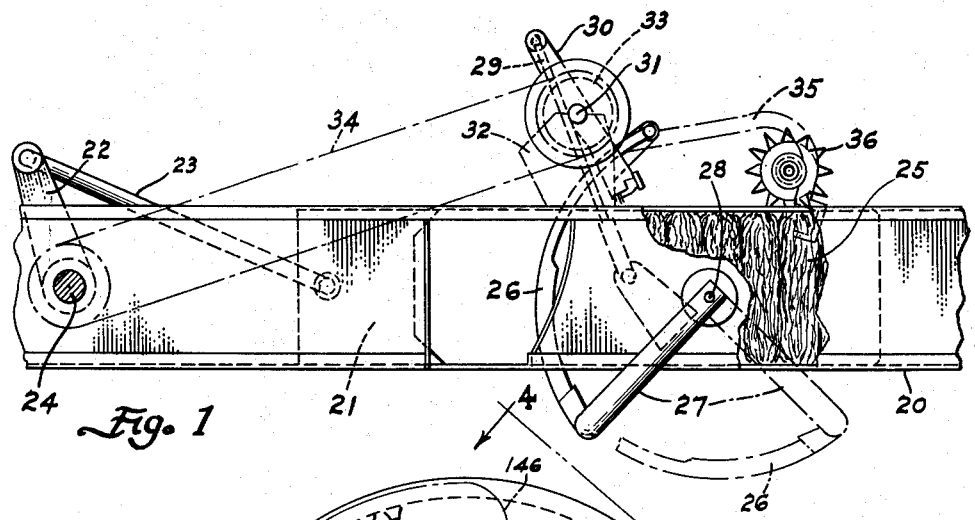
Figure 2:
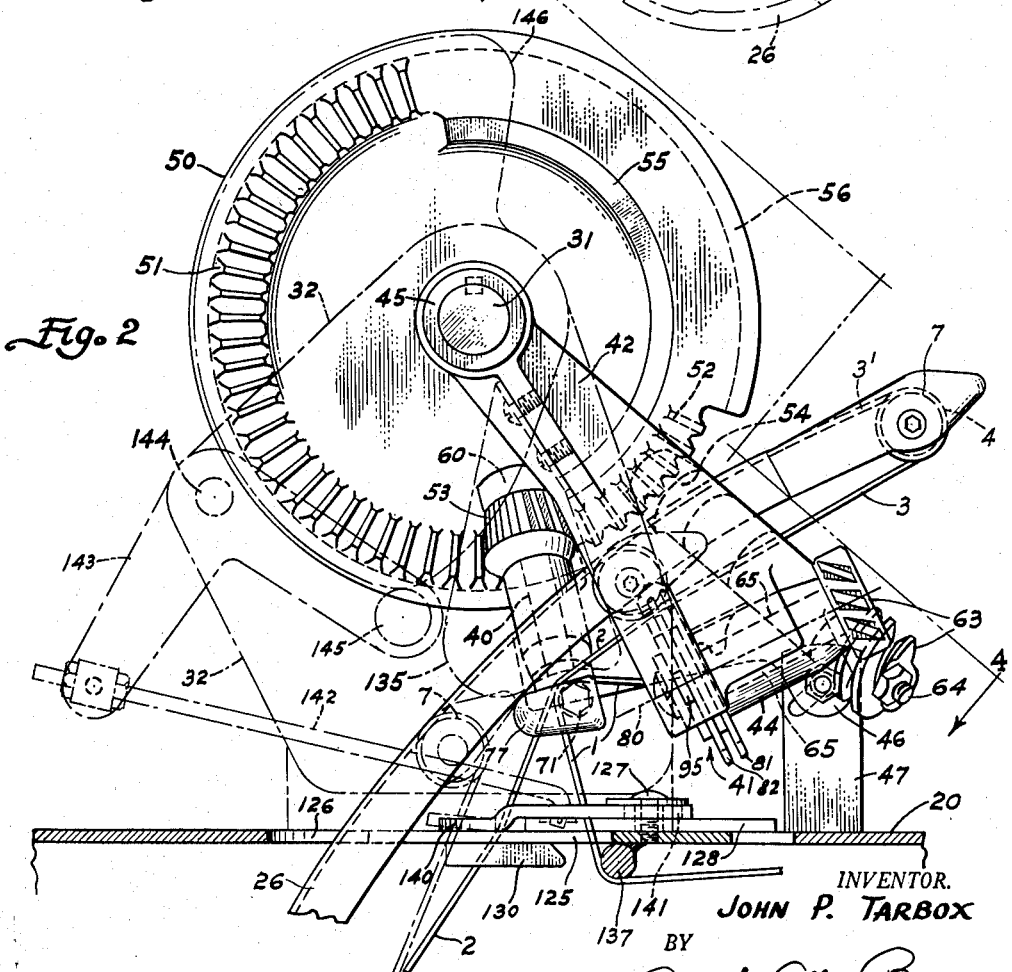
Figure 3:
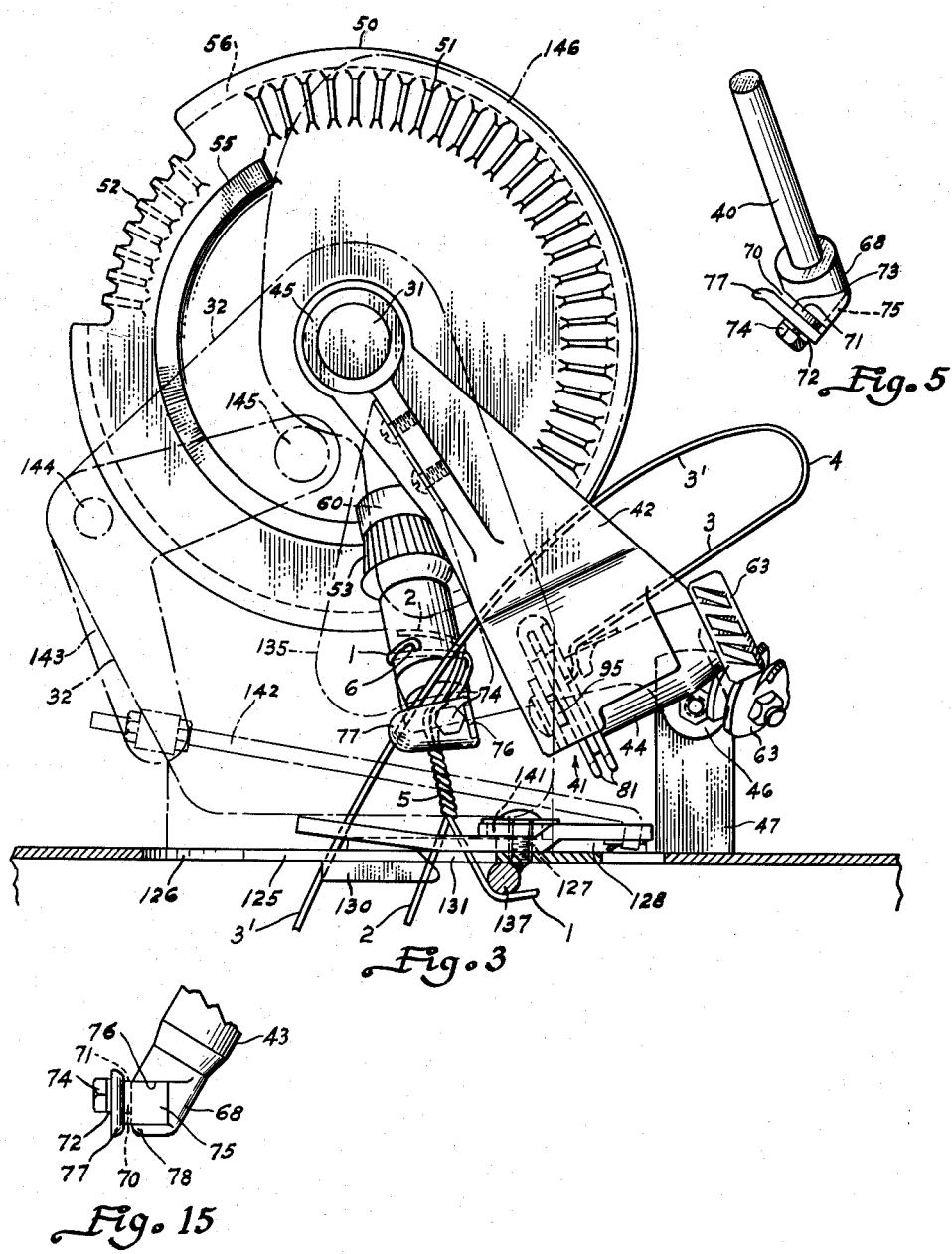
FIG. 3 is a view of the tie mechanism similar to FIG. 2, but parts thereof occupy the relative positions which they obtain when thay are at rest, certain parts being shown in phantom lines. The needle is retracted, the twist is completed and a new bale is about to be formed.
Figure 4:
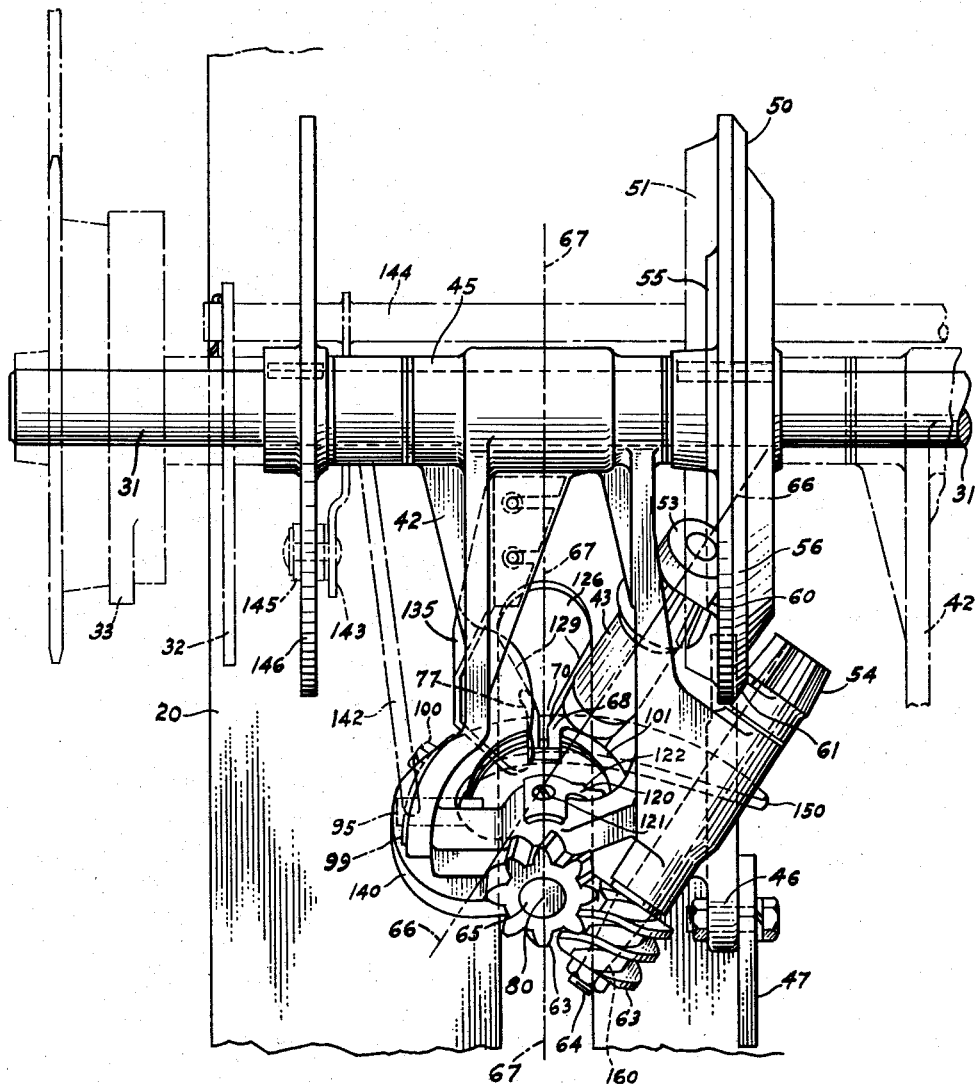
FIG. 4 is a top plan view of the tie mechanism showing the parts in the same relationship they occupy in FIG. 3, the view being taken on the lines 4—4 of FIG. 2, looking in the direction of the arrows. Certain parts here too are shown in phantom lines.

Referring now to the drawings by numerals of reference and first to FIG. 1, and as needful for general description to FIGS. 2, 3 and 4, the bale case is designated 20. The plunger which operates within the bale case to compress infed hay is designated 21. A main drive crank 22 and connecting rod 23 propel the plunger. Crank 22 is mounted on and driven by a main power shaft 24. A completed bale of hay within the case is designated 25. A needle 26 passes the wire through the bale case from bottom to top in order to effect, in coaction with the bale to be formed, the loop of wire around the bale by means of which it is to be tied. In FIG. 1 the needle is shown in solid lines in substantially its extreme uppermost position to which it has been moved from a position at rest exterior to the casing, as shown in dotted lines. 27 is the needle yoke upon which the needle shown is mounted. This yoke is U-shaped, the needle being carried by the bight of the U and the yoke being pivotally mounted on the opposite sides of the bale case at the opposite ends 28 of its arms. The yoke is driven by a linkage connection 29 with a crank 30 mounted on a timer shaft 31 which extends transversely above the top of bale case 20 and is supported in an elevated position by bearings and bearing brackets 32 associated with opposite ends of the shaft.

Timing shaft 31 receives its power by way of a conventional one-revolution-and-stop type of clutch 33 having a one-to-one connection with the main drive shaft 24 through endless chain 34. Shaft 31 may thus be operated in timed relationship to the plunger strokes, for the plunger 21 is carried through one stroke for each revolution of the driving shaft 24. The operation of the clutch is controlled by a trip lever 35 through a suitable conventional trip mechanism, not shown, and the trip lever in turn is controlled by a bale length metering wheel 36 whose points are engaged with the upper surface of a bale 25 being formed in accordance with usual practice. Thus, when the metering wheel measures a bale of desired length, lever 35 is moved upwardly to such degree as to trip clutch 33 to cause shaft 31 to go through a single revolution and stop. Through yoke 27, linkage 29 and needle crank 30, needle 26 is oscillated once from its dotted line position to its full line position and returned, whereupon clutch 33 disconnects the timer shaft 31 and the needle rests until its next operation may be required.

It will be seen from FIGS. 2–4 that the wire tying mechanism which these figures depict is mounted upon and carried in considerable part by the drive shaft 31. While only one such mechanism is shown, it is to be understood that one, two or three such mechanisms may be mounted on one and the same shaft 31, side by side, and commonly receive their power from this shaft.

The spindle for twisting together two wire ends is designated generally 40. The associated cutting and clamping device is denoted 41. Spindle 40 and device 41 are carried on a common supporting frame 42 through bearings 43 and 44 in which they are mounted for rotation. Frame 42 is pivotally mounted on shaft 31 through a head bearing 45 and at its lower end is adjustably fixed to the top of bale case 20 by a foot 46 adjustably bolted to a pedestal 47. Spindle 40 and cutting and clamping device 41 are commonly driven in timed relationship to each other from main gear 50 keyed to the timer shaft 31. The drive is through the mutilated gear segments 51 and 52, located on opposite sides of the gear 50, and respectively engaging driving pinions 53 and 54 for spindle 40 and clamping device 41, respectively. Gear segment 51 is approximately 180° in extent and its complemental land 55 of substantially the same extent. Gear segment 52 on the opposite side of the gear which drives pinion 54 is approximately 45° in extent while its complemental land 56 is approximately 315° in extent as appears in the dotted lines representation in FIG. 2. Pinion locking lands 60 and 61, respectively coacting with the gear lands 55 and 56 are fixed to the respective pinions. Pinion 53 is mounted directly upon spindle 40 and its number of teeth is such that spindle 40 is rotated through four complete revolutions during the 180° engagement of pinion 53 by the gear segment 51. Pinion 54 on the other hand, which engages with the approximately 45° mutilated gear segment 52, has a number of teeth which enables mutilated gear 52 to drive the pinion through but one revolution. In each case the pinions become locked in their rest positions at the conclusion of their revolutions. While spindle 40 is directly driven by its pinion 53, clamping device 41 is indirectly driven through worm and worm gear 63 fixed respectively to shaft 64 which mounts pinion 54, and shaft 65 which mounts the cutting and clamping device 41. The worm gear ratio is four-to-one with the result that the one revolution of pinion 54 results in but one quarter revolution of the clamping device 41.

Twisting spindle 40 in its form and arrangement comprises the heart of this wire tying mechanism. As clearly appears in FIG. 4, spindle axis 66 is inclined at a substantial angle to the vertical plane 67 which is the plane of operation of needle 26 and the plane of the loop of wire about the bale. The lower end 68 (FIGS. 5 and 15) of the spindle in fact substantially intersects this plane. While the angle between the axis 66 and the plane 67 may be changed to suit various requirements, an angle of about 30° has been found satisfactory. Axis 66 also makes an acute angle forwardly with respect to the top of the bale case. This however has but little if any relationship to the prime angularity with respect to the loop plane 67. It is provided in the interest of the object of interchange ability of this tying mechanism with a standard knotter, utilizing the same drive shaft 31 and the same location of that drive shaft, and becomes necessary in such case to provide adequate clearance between the lower end 68 of the spindle and the needle as will be apparent from an inspection of FIG. 2.

The main body of spindle 40 which passes through bearing 43 and bears the pinion 53 at its upper end is of relatively small diameter but its lower end 68 is of relatively large diameter. The diameter of bearing 43 is still greater, and its lower end is beveled to meet the large diameter lower end 68 of spindle 40. Within the projected peripheral boundaries of this large diameter lower end 68 there is provided a wire receiving and engaging slot 70 of a width but little more than the diameter of a single wire strand. Thus, when two wires to be twisted together are laid successively one on top of the other between the walls of this slot, and the spindle is rotated, the two wires so laid will be twisted together. The plane of this slot is substantially the same as the vertical plane 67 when the spindle is at-rest, whereby the needle 26 which passes the wire through the bale case in this plane may lay the wire directly in the slot. Slot 70 as embodied herein does not have all of its walls an integral part of the enlarged lower spindle end 68. Its bottom and outer side wall are formed non-integral and removable for the purpose of easy replacement in case of wear and the further purpose of ease of manufacture. Otherwise, they can be formed integral. With particular attention to FIG. 5 and 15, but also with FIGS. 2–4 in view, it is to be noted that the bottom wall is formed by a hardened steel washer 71 and the outer side wall by a hardened steel plate 72. The plate and washer are secured together, and to the angularly cut lower face 73 of the enlarged portion 68, by means of a bolt 74 threaded into the portion 68. Plate 72 is prevented from rotating about the body of the single bolt 74 by means of a right angular extension 75 from the rear end of the plate into a mating slot 76 formed in the rear wall of portion 68. The front end 77 of side wall 72 is extended forwardly, rounded in the vertical direction and flared outwardly with respect to plane 67 for the purpose of engaging and guiding into slot 70 a wire strand being laid by needle 26 which may possibly be slightly out of line. The entire periphery of the small plate 72 is rounded inwardly toward the bottom of the slot as constituted by the washer 71. Also, the upper portion of washer 71 constituting the bottom wall of the slot 70 leads almost tangentially into the outer periphery of he enlarged portions 68. This provides easy flow of the wires being twisted together about the outer periphery of the body 68 both during the twisting and after the twisting when the completed twist is drawn from the spindle by the moving completed bale. FIG. 15 also shows the rounding of the lower extremity of the enlarged portion 68 in the region 78 to coact with the rounding of plate 72 in the smoothing of the passage of the wire ends.

The clamping and cutting mechanism 41 is supported by frame 42 just far enough to the rear of spindle 40 to provide sufficient length of free wire between the clamping device and the spindle to properly effectuate the twist which is to constitute the tie. The axis of rotation 80 (FIG. 2) of shaft 65 which rotates the device 41 preferably lies in the plane of the loop 67 as can be seen in FIG. 4. Referring now more particularly to FIGS. 7 and 8, in conjunction with FIGS. 2–4, the elements of this device consist of a pair of steel discs 81—82 spaced apart by an intervening washer 83. Together with the washer they are mounted for rotation upon and by shaft 65 through rectangularly shaped central apertures 84 on side walls of which are fitted about a flat sided end of the shaft 65. These discs are arranged in planes substantially at right angles to the lower strand of the loop of wire presented by the needle for the tying operation (see FIG. 2). They are of relatively large diameter as compared with shaft 65 and each disc is provided with four rectangularly shaped notches 86 spaced 90° apart. The notches in the respective discs are in register. In front of the discs 81—82 and adjoining the front one 82 is a cutter disc 87 which is non-rotatively borne on the forward end of the shaft 65 through the bearing of a circular aperture 88 in the disc upon the circularly rounded opposite sides of the flattened end portion 85 of the shaft. The periphery of cutter disc 87 is extended in region 89 to form a radial cutting edge 90 which makes a substantial angle with the plane 67, preferably an angle in the neighborhood of 45°. Extension 89 and cutting edge 90 extend radially outwardly substantially to the periphery of the disc 82, while the principal periphery of the disc is of a diameter somewhat less than the distance to the bottoms of opposite notches 86. Disc 87 bearing cutting edge 90 is normally fixed in a given position by a radially extending arm 95 which is projected through a slot 96 in an arm 97 of frame 42. There it is fixed adjustably by a close fitting slotted connection with 98 with a plate 99 which in turn is adjustably secured to arm 97 by means of a securing bolt 100, plate 99 being in its turn also slotted for movement with respect to bolt 100. Preferably both arm 97 and plate 99 are arcuate in shape and formed on a radii about the axis 80 of shaft 65 upon which clamping discs 81 and 82 are mounted.

Coacting with clamping disc 81 is a non-rotatable clamping means in the form of an arcuate clamping segment 101 approaching 90° in extent and having an inverted U cross section which appears in FIG. 8. The inner arm 102 of this U is shorter than the outer arm 103. It is of a thickness somewhat less than the thickness of the washer 83 which spaces the discs 81 and 82 apart whereby it may freely enter between the discs and move radially up and down therebetween. Segment 101 is supported and is borne radially toward the discs 81 and 82 by a biasing flat spring 104. End 105 of segment 101 is secured to spring 104 by bolt means 106. It is also fixed for adjustment angularly about the disc peripheries by the same spring 104, the spring 104 hanging from an arm 107 of the frame 42 and adjustable vertically by means of the slots 108 through which securing screws 109 are passed. The inner periphery 110 of the inner arm 102 of the segment 101 is formed on a radius somewhat less than the radius at which the bottoms of the slots 86 lie. The nose portion of the segment is undercut at 112 and beveled radially inwardly from the outer peripheral end of the segment substantially to the region of location of the cutting edge 90 to provide an incline toward the cutting edge. Inner periphery 110 which approximates the radius of the circle 111 of the bottoms of the notches is continued from the end of the incline 112 and from the region of the cutting edge 90 to the lower extremity of the segment and this lower extremity is rounded as shown. Located, as this segment 101 is, in a position to coact with what may be called the northeast sections of the discs 81—82, the nose portion 112 lies near the uppermost notch 86 while the tail portion 113 overlaps the next notch beyond, a range of substantially 90°. When the parts are at rest and in the position shown in FIG. 7, the uppermost and lowermost of notches 86 are symmetrically located substantially in the plane 67. The parts just now described are held on the shaft 65 by an axially directed securing bolt 114 which bears upon the cutter disc 87 through a washer 115 (FIG. 8).

Coacting with the various elements of spindle 40 and the clamping and cutting device 41 are a group of wire guides which aid the various elements and the needle in effecting the lays of the coextended ends of the loop to be twisted together. First, is the wire loop guide 120 (see FIG. 4). This guide is in the form of a flat plate secured to the top of the bearing 44 of shaft 65 by an adjusting bolt or screw 121. Its front edge bears flatly against the rear face of the rearward disc 81, but its righthand side (FIG. 4) laying toward the clamping segment 101 is upwardly extended and provided with a shallow notch 122 of a depth but slightly greater than the diameter of a wire strand. The function of guide 120 is to engage in notch 122 the clamped end of the needle loop brought up by the needle, as it is moved to the right (FIG. 4) in a notch 86 of the clamping device 41, and deflect and bend it somewhat as the clamped end reaches the rest position shown in FIG. 12, so that when the strand is drawn down upon the commencement of a new bale it will straddle and ride across the outer periphery or back of the segment 101.

The next guide is the bale case slot guide 125 which can be seen in FIGS. 2, 3 and 6, and which is shown in detail in FIG. 13. This comprises a plate which bridges the bale case slot 126 through which the needle passes and is secured in place by a bolt 127 which passing through the top of an overhanging plate 128 pulls the rear end of plate 125 snugly up against the underside of this plate. As appears most clearly in the plan view of FIG. 13, but can also be seen in FIG. 3 this plate is slotted from its front end almost all the way back to its rear end, the slot lying substantially in the plane of the loop 67. At its front end the walls of this slot are flared apart as indicated at 129. Intermediately (FIG. 13) the walls 130 lie close together, but slightly more than wire diameter apart. These narrow walls guide the loop strand vertically insuring its position substantially vertically in the loop plane 67, and hence more assuredly guiding it to engagement with the nose portion 77 of the side wall 72 of the spindle slot 70. In the region below the spindle 40 the side walls 130 terminate on a downwardly inclined angle as can be seen in FIG. 3 and the slot in plate 125 is widened at 131 to a width of several wire diameters whereby the wire ends to be twisted together can be twisted freely without interference from the side walls of the slot and whereby the twist when completed can be freely drawn down through the widened portion 131 to follow the progress of the bale from the case.

A third guide is that numbered 135 in FIGS. 2–4. It is affixed to the arm 97 of frame 42 and its lower margins lie at an elevation in the neighborhood of the elevation of the upper margins of side wall 72 of the twisting slot of the spindle 40. Forwardly, the lower margins of guide 135 are flared outwardly rather extendedly from loop plane 67, but rearwardly, and close to the fore end of wall 72 of slot 70 they closely approach or enter plane 67. Like the plate 125, guide 135 engages the loop strand as it is being brought forward by a bale being formed, but at a decidedly higher elevation than the slot guide 125. It coacts with the narrow vertically extending deepened walls 130 of guide 125 to keep the loop strand upright and in the neighborhood of the plane 67 until it is laid within the forward extended end 77 of wall 72 of slot 70.

A fourth member of this guide group is the bale strand guide 137 which is affixed by welding to the underside of the bale case guide plate 125 in the neighborhood of its anchorage at the bolt 127. (FIGS. 2, 3 and 13). This is in the form of a very highly hardened and long wearing cylindrical member of a fraction of an inch in diameter such as from ⅜ to ⅝ inch. Its rounded fore surface, in its transversely extending position, underlies and extends slightly forwardly of the rear end or bottom of the widened slot portion 131. The bale strand guided into place by the guide 125, and the coacting guide 135, and drawn taut from the slot 70 by the advancement of the bale being formed reaches directly from the bottom of slot 70 to the fore surface of guide 137, as appears clearly in FIG. 2. Longitudinal adjustment of guide 125 will also longitudinally adjust guide 137.

The last member of this group of guides is movable guide 140. This is an oscillatable wire moving finger which appears in FIGS. 2–4 and is shown in detail in FIG. 6. The finger is adjustably pivoted about an eccentric washer 141 about the body of the bolt 127, the same bolt by means of which guide plate 125 is secured in place. Oscillation of this guide is by means of a link connection 142 to a bell crank 143 supported oscillatably on a shaft 144 journaled in the bearing brackets 32. One arm of this bell crank 143 connects with the link 142. The other arm bears a cam follower 145 which is actuated by a cam 146 borne by the timer shaft 31. The relation of cam 146 to the follower on the one hand and to the needle crank 30 and needle 26 on the other is such that just as the needle emerges from the top of the bale case, cam 146 actuates the guide 140 to carry its point 150 behind the rear strand of the needle loop and between it and the body of the needle and then quickly to carry that strand rearwardly into and through the narrow deepened slot portion 130 of the guide plate 125 so that as the needle lays this strand in slot 70 this needle strand will bear the relation to the bale strand shown in FIG. 2.

*Operation*

Throughout the drawings the wire ends of the loop about the bale which are to be twisted together are designated, respectively, 1—the free end of the bale strand, i.e., the strand which is laid by the bale itself in its process of formation, 2—the needle strand end, i.e., the end of the opposite strand which is brought up by the needle around the rearmost wad of the bale to complete the loop. End No. 1 of the bale strand may be referred to as the precedingly laid strand since it is laid in the slot 70 of the twisting spindle 40 by the bale itself. No. 2, or the end of the needle strand which is to be twisted together with the No. 1 strand, may be referred to as the newly laid strand or succeedingly laid strand, for it is laid on top of the No. 1 strand in the twisting slot 70 of spindle 40 by the needle upon the completion of the bale loop. Throughout the drawings also the remainder of the wire loop brought up by the needle to the wire twisting mechanism is denoted loop 4 and is comprised of rearward strand 3 and forward strand 3'. A completed twist is designated 5 (FIG. 3).

With the parts in the position shown in FIG. 3 the plunger delivers and compresses the next succeeding wad. Such wad, which is to be the first wad of the next bale, engages the rearward strand 3' of the needle loop 4 and carries this strand rearward of the bale case with the wad. The loop 4 is drawn downwardly a considerable distance, pulling strand 3' toward slot 70. Before strand 3' enters slot 70, the ends of the twist 5 are withdrawn therefrom by the rearward advance of the tied bale when the plunger drives the first wad of the next bale rearwardly. The No. 1 and No. 2 ends of twist 5 are jerked right through slot 70 as the completed twist 5 moves through the enlarged portion 131 of slot 130 in bale case guide 125 and passes beneath the fixed guide 137. The fact that the lower end of spindle 68 is of relatively large diameter avoids acute curvatures of the ends 1 and 2 as wrapped around the spindle and renders it easy for them to be pulled off the spindle and out of slot 70 upon movement of the tied bale. Succeeding wads of the new bale being formed progress the completed twist 5 along the bale case with the tied bale. Within two or three wads, the bale strand 3—3', which originally constituted the needle loop 4, is drawn under tension tautly from its clamped end 6 (see FIGS. 7 and 9) over the washer 71 and directly down to and under the fixed bale case guide 137. Thus, the No. 3 strand, which formerly constituted the needle loop 4, becomes the No. 1 end of the new bale strand, as clearly appears in FIG. 2.

Referring again to FIG. 3 in which the needle loop is shown in its form before it has been reached by the first wad of the new bale, the action of the bale case slot guide 125, and the fixed guide 135 mounted on frame 42 in coaction with the outwardly flared nose 77 of the side wall of slot 70 should be noted. With the parts at rest, the moving wire finger guide 140 is at rest in the lowermost dot and dash line position shown in FIG. 6 and the needle strand 3' is free under the guidance of the tapered ends 129 of guide 125 to enter the deep walled slot 130 of this guide which it does when the first wad of the succeeding bale strikes it. These deepened walls keep the strand 3' in its lower reaches vertical, for the width of the slot is but slightly greater than the diameter of the wire. It sometimes happens however that the upper reaches of the wire, due to some preset in the wire itself, do not partake of this verticality. These upper reaches are then engaged by the inner surfaces and the lower edge of the sheet metal guide 135 in such manner that between this influence and the influence of the bale case slot guide 125 the bale strand 3', and ultimately the entire remainder of the needle loop 4, are led directly into contact with the outwardly flared end 77 of the side wall of slot 70 and thence to the bottom of the slot itself.

The new bale being formed having been completed in length according to the measurement of the star wheel 36 (FIG. 1), clutch 33 is tripped and the wire tying mechanism goes through a complete tying cycle. As usual, this involves a one revolution and stop movement of the timer shaft 31 and the parts mounted upon it. Having reference particularly to FIGS. 1 and 2, and the timing diagram in FIG. 14, the first 80° of movement of shaft 31 brings needle 26 through the bale case to the lower dotted position of FIG. 2, a position in which the needle roller 7 is just above the top of the bale case and strand 3 of the needle loop 4 is spaced a fraction of an inch from the rear face of the needle itself. At this juncture the cam 146 engages cam follower 145 and enters the sharp point 150 of the moving wire finger guide 140 between the strand 3 and the rearward face of the needle as shown in the intermediate dotted line position of FIG. 6. In the next 100° of movement, finger 140 moves all the way in to the full line position shown in FIG. 6. At this time, the timer shaft 31 has moved through 180° carrying all parts operated directly by it through 180° of movement. Thus, the needle then reaches the upper extremity of its movement and the positions of the parts associated therewith are as indicated in full lines in FIG. 2. Thus, the needle loop 4 is fully formed. The strand 3 of the loop, the lower reach of which is to be constituted the No. 2 end of the twist to be formed, is laid directly by the needle into the slot 70 while the lower end of its upper reach is laid directly in the uppermost notch 86 of the clamping and cutting device 41 which lies in the plane of the bale loop, as does the twisting slot 70. Movement of the movable wire finger guide 140 to its 180° position having taken place simultaneously with the movement of the needle to the same degree, the newly laid No. 2 end of the bale strand portion of the bale loop has been moved rearwardly by finger 140 toward the precedingly laid No. 1 end. The No. 2 end is now held there since the periphery of cam 146 now engaged by follower 145 is of uniform radius. The relative thickness of the body of the wire moving guide 140 is such that the acute angle which the No. 2 end makes with the axis of spindle 40 or with the bale case is so related to the acute angle made with the axis of the No. 1 end that uniform twisting of the two ends about each other is subsequently obtained when spindle 40 is rotated. Obviously, this can be adjusted not only by altering the width of the wire moving finger 140, but also by changing the position of the eccentric mounting 127 of the finger. Still further, the extension of the No. 1 wire can be varied by shifting longitudinally of the bale case the guide 137. It is a matter of relative angularity of the two ends, No. 1 and No. 2, to each other, as well as relative angularity to the axis of the spindle, and as well as to the top of the bale case which effects the nature of the twist. Relative length of the leads from the slot 70 to finger 140 and to the guide 137 is also a factor. Equal lengths of such leads is preferable. However, relative teneness in the leads may require adjustments to attain uniformity of twist.

However, before the needle reaches its 180° position and the needle loop 4 is completely formed, in the illustrative timing depicted in FIG. 14 sometime between the 110° of the needle and the 115° position, the point of the needle passes the spindle 40 and reaches a point substantially in the plane of the end clamping and cutting device 41 as shown by the intermediate dotted line position in FIG. 2. At this time, between the action of the moving wire guide finger 140 and the needle, the lower reach 3 of needle loop 4 is laid directly in the wire twisting slot 70 of the inclined spindle 40 and becomes the No. 2 end. This newly laid end is rested under tension over the top of the precedingly laid end No. 1 as clearly appears in FIG. 2.

Between this laying of No. 2 end and the complete formation of the needle loop 4, at a point approximately 155° of needle movement as shown in FIG. 14, the 45° tooth segment 52 of the main gear 50 (see FIGS. 3 and 2) engages the pinion 54 which drive the cutting and clamping device 41 by way of the worm and worm gear 63, thus starting the 90° rotational shift to the right of clamping and cutting discs 81—82, as viewed from the rear in FIGS. 4, 7 and 9–12. Since the needle at this time is within 25° of its uppermost position, its strand 3 is substantially entered into the uppermost notch 86 of the discs 81—82. Therefore, it is in position to be engaged by the lefthand wall of the notch and carried to the right by discs 81—82 as they move. This condition is depicted in FIG. 10. Prior to this, as can be seen by reference to FIGS. 7 and 9, the end 6 of the precedingly laid No. 1 end has been held fast beneath the rear extremity 113 of the normally fixed clamping segment 101 and the bottom and lefthand (now upper) walls of the next notch in advance of the uppermost notch 86, having been placed in this position and clamped there during the process of tying the preceding bale in a manner which will presently become apparent. It is because it was so placed and clamped that the needle loop 4 shown in FIG. 3, could be pulled tautly down by the first wads of the newly formed bale as shown in FIG. 2. Now however in the first few degrees of movement of the clamping discs 81—82 as depicted in FIG. 10, the clamped extremity 6 of the No. 1 strand end is moved from under the rear extremity 113 of segment 101 and released, for it has been clamped very near to the extremity. FIG. 10 shows this clearly. According to FIG. 14 this takes place at about the 160° point in the cycle.

During all the foregoing movements of the wire, the needle, and other parts which have moved the wire, there has been no movement whatever of twisting spindle 40. At the 180° point in the cycle however (the point at which the needle starts back) the approximately 180° gear segment 51 of the main gear 50 engages the pinion 53 and institutes rotation of the spindle 40. Once the spindle starts it continues its rotation until the twist is entirely complete. Four complete revolutions are required to complete four twists of Nos. 1 and 2 together. Shortly after the institution of the first turn however, when the spindle has made but one-eighth, one quarter or one half turn, as may be desired, (according to FIG. 14) it has made approximately one-eighth of a turn, for five degrees progression of the cycle is one ninth of 45°. Therefore, after one ninth of a turn of the spindle the newly laid No. 2 end is cut and released from No. 3 strand of the needle loop 4, while the No. 3 strand has become firmly clamped between the bottom and left side walls of notch 86 and the relatively fixed clamping segment 101. This is brought about by the operation of the notch 86 in which the new No. 2 end is laid, in its shaft beneath the clamping segment 101, first carrying the No. 2 end and the then connected rearward strand 3 of the needle loop beneath the laterally and downwardly inclined under surface of the clamping segment 112, and then under the deeper section 110 of segment 101 which bears it hard down upon the bottom walls of notch 86 just before or just as strand 3 reaches cutting edge 90 of the cutter disc 87, so clamping the strand firmly. Reaching the cutting edge 90, the left wall of the notch continues to bear upon strand 3 until it severs and frees the No. 2 end therefrom. This is the situation depicted in FIG. 11.

Merely by rotating the cutter disc 87 about the end of shaft 65 on which it is pivoted through the adjustment means 98, 99 and 100 shown in FIG. 7 the point in the cycle when the No. 2 end is cut and released can be adjusted in accordance with the degree of pretwist desired of the spindle 40. Thus instead of the approximately one-eighth of a revolution of pretwist brought about by release at the 185° point shown in FIG. 14, there may be had approximately one quarter revolution of pretwist by cutting and releasing approximately at 190°, utilizing 10° of the cycle instead of 5°. Approximately one quarter of a revolution of pretwist is that illustrated in the section of the spindle 68 which accompanies the portrayal of the action of clamping discs 81—82 in FIG. 11 and which corresponds to the dotted line showing of the lower end 68 of spindle 40 in connection with the showing of the discs 81.

At this juncture the terminal end 6 of the precedingly laid No. 1 end along with the terminal end 8 of the recently formed No. 2 have been wrapped from one eighth to one quarter turn around the enlarged lower end 68 of spindle 40. The cycle continues and when notch 86, which carries the newly laid end, has advanced 90°, motion of discs 81—82 stops and the discs are fixed in position until the next tying cycle is brought about, the next ensuing or succeeding notch 86 being now presented in the plane of the bale loop. A fixed position is brought about the interlocking of pinion land 61 and main gear land 56 which ensues upon the completion of but one revolution of the pinion 54 which drives the cutter and clamping device 41. As appears in FIG. 12 the newly clamped end 6 now rests beneath the lower extremity 113 of segment 101. Discs 81—82 and the clamped end 6 remain in the position shown in FIG. 12 for the remainder of the twisting operation and completion of the four turns of the twist 5 shown in FIG. 3. At the close of this twisting operation, when the substantially 180° segment 51 of main gear 50 leaves the land 60 of twisting pinion 53, the pinion becomes locked to land 55 of the main gear and the spindle, like the discs 81—82, becomes fixed in its rest position, and its notch 70 like the uppermost notch 86 of the discs 81—82 in this position lies in the plane of the bale and needle loops.

The behavior of the wire of the needle loop 4 during the operations of the cutting and clamping discs 81—82 just described is notable. Firstly, incident to the substantially immediate release of the No. 1 or precedingly laid end upon institution of the movement of the cutting and clamping discs 81—82, with no preliminary degree of rotation of the spindle 40, no undue tension whatsoever is placed upon the No. 1 end by reason of the subsequent twist or wrap around the spindle. Though released immediately and before there is a pre-twist, the No. 1 wire is prevented from flying out of the twisting slot 70 by the pressure upon it of the overlying newly laid No. 2 portion of the needle loop 4. Secondly, undue tension in the No. 2 portion of the needle loop, which might be occasioned by the pretwist action of the spindle 40, is avoided by reason of the fact that the left end of the clamping segment 101 is undercut at 112 almost if not quite to the inner clamping periphery 110, and therefore the newly laid No. 2 end does not become firmly clamped until just before or during the cutting action which takes place against the cutting edge 90. While the pretwist of one eighth, one quarter, or over of a revolution of the spindle is taking place, wire is being fed to the needle loop. Wire is drawn from the wire supply coil and over the needle roller 7 which constitutes the point of the needle and between the under inclined surface 112 of segment 101 and the walls of the notch 86. The wire may pass relatively freely between these surfaces until the point of cutting it is reached at the innermost periphery 110 of the clamping segment 101. Tension in the needle loop 4 is not so high but that even during the clamping and cutting which takes place in the vicinity of the cutting edge 90 that such further tension in the No. 2 end as is brought about by the small degree of twist which takes place between the moment of clamping and the moment of full severing is taken care of by draft upon the wire of the bale strand across the adjacent end of the bale. Under these circumstances the No. 2 end can not be broken by reason of the pull of the turning spindle upon it while it is firmly clamped between the clamping discs and the coacting segment 101. Thirdly, the behavior of the needle loop and particularly the behavior of the strand 3 of the needle loop in this passage between the discs and segment 101, is notable. Needle loop 3 passes from the plane of the bale loop to the right as clearly appears in FIGS. 11 and 12. As it so passes, the plane of the needle loop becomes intersected by the clamping segment 101 with the result that the strand 3, when the needle loop is drawn down as described at the outset of this description of the operation, will become saddled across the back of the clamping segment 101 as shown in FIGS. 7 and 9. This is by reason of the fact that the back or outer periphery of the segment 101 extends freely into the space surrounding the clamping discs 81—82 and strand 3 thus encounters no obstruction as the loop 4 is drawn down. Fourthly, this action is enhanced and rendered certain by virtue of the engagement of strand 3 near its extremity 6 with the bottom wall of notch 122 in the fixed wire guide 120 which is secured to the top of the bearing 44 which journals the discs 81—82. The walls of this notch deflect strand 3 to the right yet further than it would otherwise be moved by the progression of the containing notch 86 to the 90° position, and as clearly shown in FIG. 12 so insuring its straddling of the segment 101. Fifthly, when the strand 3 is so saddled over the outer periphery of segment 101, it is beyond reach of cutting edge 90. It is not again cut and there are therefore no short wire rejects as in certain types of twine knotters.

The parts being at rest as shown in FIG. 3 the first wad of a bale, as it follows the second bale with respect to which the operations have just now been described, institutes a second series of wire movements culminating in a second cycle of the wire tying mechanism.

Obviously there are possible many modifications without departing from the generic spirit of the invention described. Obviously, too, there may be made other adjustments of the parts than those described. For example, instead of providing a cutting and clamping device 41 (FIGS. 7 and 8) having the cutting disc 87 and the clamping segment 101 separately and independently adjustable, provision may be made for their adjustment together. Such a cutting and clamping device is shown in FIG. 16 where similar parts have been similarly numbered as respects FIGS. 7 and 8. Here the cutting edge 90 has been constituted a part of a radially inward extension 153 of the forward arm of the U-shaped section of the segment 101. This extension 153 is secured by screws or rivets 154 to the right hand end of a disc-like support 155 for the cutting and clamping segment 101. This support, like the cutter disc 87, is borne upon the forward end of the shaft 65, the shaft being projected through a slightly laterally elliptical aperture in the disc 155, whose vertical dimensions are such as to fix the disc vertically but permit a limited amount of lateral movement. The left end of this disc is connected to a rod 156 welded thereto and a tension spring 157 surrounds the rod 156 and is compressed between the arm 42 of the casing through which it projects by way of slot 96 and jam nuts 158 adjustable on its outer end. So organized, clamping segment 101 may have its clamping pressure freely adjusted by adjustment of nuts 158. The segment together with the cutting edge 90 which it carries can be angularly adjusted together merely through angular movement of anchoring plate 99 in the same manner as is the cutter alone in the form in FIGS. 7 and 8.

In another area of operation adjustment to a limited degree of the time of cutting and clamping and of release of the No. 1 end, and more importantly adjustment of the notches 86 with respect to the plane of the bale and needle loops may be had by releasing the worm 63 from its driving shaft 64 and the beveled end thereof through which it is affixed thereon, whereupon discs 81—82 may be freely rotated with respect to driving pinion 54 and its interlock 56—61 with the main gear 50.

While my invention has been described in connection with a particular structure, certain possible modifications having been mentioned, it will be understood that it is capable of further modification and this application is intended to cover any variations, uses or adaptations of the invention following in general the principles of the invention as come within known or customary practice in the art to which the invention pertains or as comes within the scope of the invention and the limits of the appended claims.

Having thus described my invention, what I claim is:

1. A wire tying mechanism operable to twist together the ends of a wire loop surrounding a bale and adapted to be mounted along a wall of a bale case having a forward end and a rear end comprising a rotatable twisting spindle inclined transversely relative to said bale case and having a wire end engaging and twisting slot formed adjoining one end thereof in a plane intersecting the axis of the spindle at an acute angle, said slot being of a width substantially equal to the diameter of said wire of said loop, said spindle having an at-rest position wherein said slot is opened forwardly and inwardly relative to said bale case, means for forming the wire loop about the bale substantially in the plane of the slot and for laying the ends of the loop to be joined in the slot while the spindle is at rest, and means supporting and rotating the spindle.

2. A wire tying mechanism for hay balers according to claim 1 in which the forwardly opening portion of said slot has a bottom approximately upon the axis of rotation of the spindle whereby the twist may occur substantially on the said axis.

3. A wire tying mechanism for hay balers according to claim 1 in which the inwardly opening portion of the slot is located near the point at which the spindle axis intersects the plane of the wire loop.

4. A wire tying mechanism for hay balers according to claim 1 in which the bottom of the slot upon which the wire ends seat is located radially outwardly of the axis of the spindle and above the point of intersection of the spindle axis with the said loop plane.

5. A wire tying mechanism for hay balers according to claim 1 in which at least one wall of the slot is projected beyond the periphery of the spindle end and extended away from the plane of the loop to guide the wire into the slot while the spindle is at rest.

6. A wire tying mechanism for hay balers according to claim 5 in which there is provided a fixed wire guide in a position to engage the wire ahead of said projected wall of the slot and guide it into engagement with said projected wall.

7. In a baling machine having a bale case in which the material to be baled is compressed into bale form, which bale case is provided with wire passing slots to permit passage through the case of wire for tying the bale, means for forming a wire loop about a bale in a determinate plane with ends coextending outside the perimeter of the loop, a rotatable twisting spindle whose main body is inclined transversely relative to said bale case and extends to one side of the loop plane, said spindle bearing at one end wire ends receiving and twisting means which normally lies at rest in said plane in a position to directly receive said ends as the loop is formed and in position and engagement for twisting, wire guiding means associated with the slot in the bale case and having one end in the form of a narrow elongated channel in the plane of the wire ends receiving and twisting means, which channel has parallel walls so spaced to accommodate freely but a single strand of the wire and the end portion of said slot opposite said one end being sufficiently wide to allow the wire ends to pass freely therethrough after they are twisted together, and means for rotating said spindle to achieve the twist.

8. A twisting mechanism for hay balers operable to twist together the ends of a wire loop surrounding a bale comprising means for forming the wire loop about the bale in a determinate plane with ends coextending outside the perimeter of the loop, a rotatable twisting spindle for said ends located to one side of the loop plane and bearing at one end a wire end receiving and twisting slot which normally lies at rest in said plane in a position to directly receive said ends as the loop is formed in position and engagement for twisting, said slot having a width substantially equal to the diameter of the wire, means for rotating said spindle to achieve the twist, a shiftable end clamping member bearing spaced end receiving and clamping formations, one of which formations, when the member is at rest, lies in a first position substantially in the plane of the loop to directly receive a newly laid end and connected strand ready to be clamped, while the next adjoining formation holds in clamped relation a precedingly laid end in a second position removed from the said first position, means for shifting said clamping member when the newly laid strand is engaged by the one formation to move said newly laid end from the first position to the second before said spindle is rotated, normally fixed means coacting with the clamping member during its shift from the first position to the second to release the precedingly laid end, and to clamp the newly laid end, which normally fixed means has a periphery extending freely from the first position toward the second position.

9. A wire end twisting mechanism according to claim 8 in which the means for rotating the spindle and the means for intermittently shifting the clamping member are interlocked in a timed relationship which assures release of the precedingly laid end before any rotation of the twisting spindle takes place.

10. A wire loop ends twisting mechanism for hay balers according to claim 8 in which there is provided relatively fixed means engaged by the newly laid end in moving from the first to the second position for severing the newly laid end of the loop from the continuous strand on the loop side of the clamping member after the clamping takes place, and in which the means for rotating the spindle to achieve the twist commences its rotation before the newly laid end reaches the severing means and the newly laid end is not fixedly clamped against linear movement until substantially the time of severing together with an interlocking driving gearing between the twisting spindle and the end clamping member which establishes such timed relationship.

11. A wire end twisting mechanism according to claim 8 in which the width of the slot in the spindle which constitutes the wire end receiving and twisting means is insufficient to accommodate two wire ends laid side by side whereby one must be laid on top of the other and the interlocking between the spindle and the shiftable clamping member so times their relative movements as to enable the spindle to receive the newly laid end over the top of the precedingly laid end before the latter is released.

12. In a tying mechanism for hay balers operable to twist together the ends of a wire loop surrounding a bale, means for forming a loop of a continuous strand in a determinate plane and with ends coextendingly laid outside the loop, a shiftable end clamping member bearing spaced end receiving and clamping formations, one of which formations when the member is at rest lies in a first position in the plane of the loop to directly receive a newly laid end ready to be clamped while the next adjoining formation holds in clamped relation a precedingly laid end and connected strand in a second position removed and separate from the first position, means for shifting said member to move the one formation and the newly laid strand from the first position to the second position, normally fixed means coacting with the clamping member during its shift from the first position to the second to release the precedingly laid end and to clamp the newly laid end, which normally fixed means has a periphery extending from the first position toward the second position, and means for intermittently shifting said member.

13. A bale loop end tying mechanism for hay balers according to claim 12 in which the shiftable end clamping member which bears spaced end receiving and clamping formations is in the form of a disc provided with equispaced wire receiving notches in its periphery, and a means for intermittently shifting said member in a unidirectional means.

14. A wire tie mechanism for a hay baler having a bale case into which crop material is fed and formed into bales, each bale moving from a forward toward a rear end of said bale case as it is formed, said mechanism comprising a releasable clamping and cutting device on one side of said bale case holding a free end of a wire, a rotatable twisting spindle mounted forwardly of said device and inclined relative to said bale case one side, wire receiving and twisting means at one end of said spindle, said free end wire extending rearwardly from said device, over said wire receiving and twisting means, and then across said bale case to the side of the bale case opposite said one side, a bale as it is formed moving against said wire whereby the wire is extended around two sides and one end of the bale, needle means operable to project a loop of said wire around the other end of the bale from said opposite side to said one side of said bale case and place one strand of said loop in said spindle wire receiving and twisting means on top of said free end wire and into engagement with said device, means for actuating said device to release said free end wire and then clamp and cut said one strand of said loop, said free end wire after release being held in said wire receiving and twisting means only by said one loop strand placed thereon, and means for rotating said spindle subsequent to the release of said free end wire to twist together the free end wire and said one loop strand.

15. A wire tie mechanism as recited in claim 14 wherein said one loop strand is cut and clamped subsequent to the beginning of rotation of said spindle.

References Cited in the file of this patent

UNITED STATES PATENTS

| | | |
|---|---|---|
| 1,590,319 | Robbing | June 29, 1926 |

FOREIGN PATENTS

| | | |
|---|---|---|
| 293,077 | Germany | July 13, 1916 |
| 293,105 | Germany | July 15, 1916 |
| 314,460 | Germany | Sept. 19, 1919 |
| 760,666 | Great Britain | Nov. 7, 1956 |